A. B. SMITH.
SHADE SUPPORT.
APPLICATION FILED JULY 1, 1916.
1,249,222.
Patented Dec. 4, 1917.
4 SHEETS—SHEET 3.
Fig. 4.
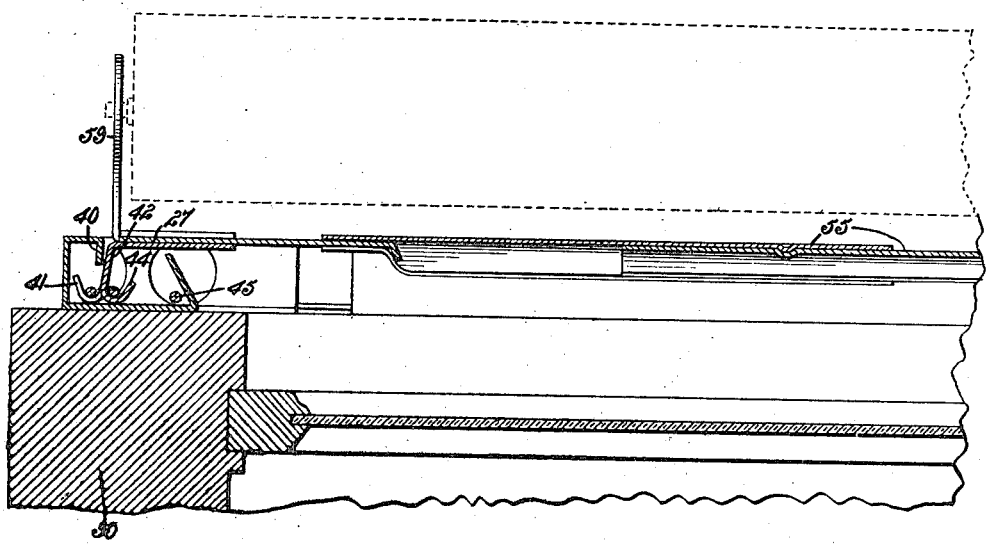
Fig. 5.
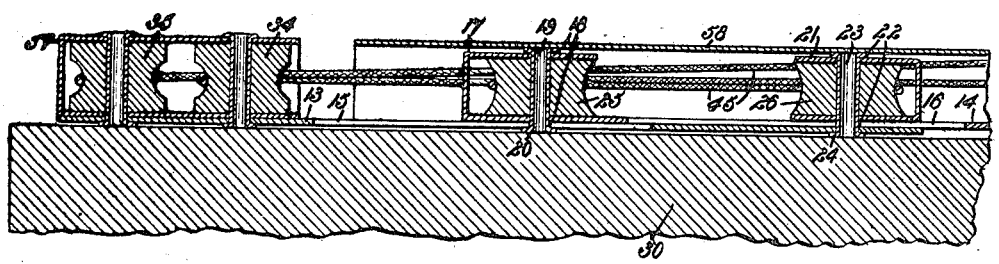
Fig. 6.
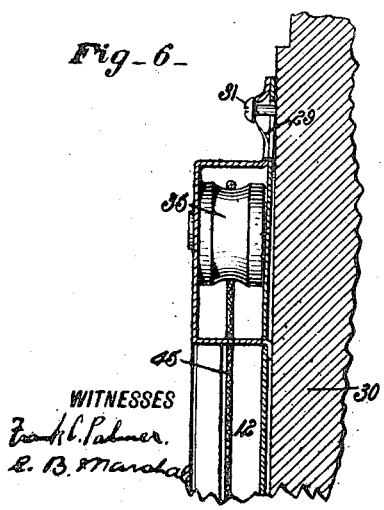
Fig. 7.
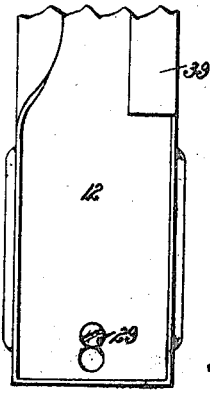
Fig. 8.
WITNESSES
INVENTOR
Alva B. Smith
BY
ATTORNEYS A. B. SMITH.
SHADE SUPPORT.
APPLICATION FILED JULY 1, 1916.
1,249,222.
Patented Dec. 4, 1917.
4 SHEETS—SHEET 4.
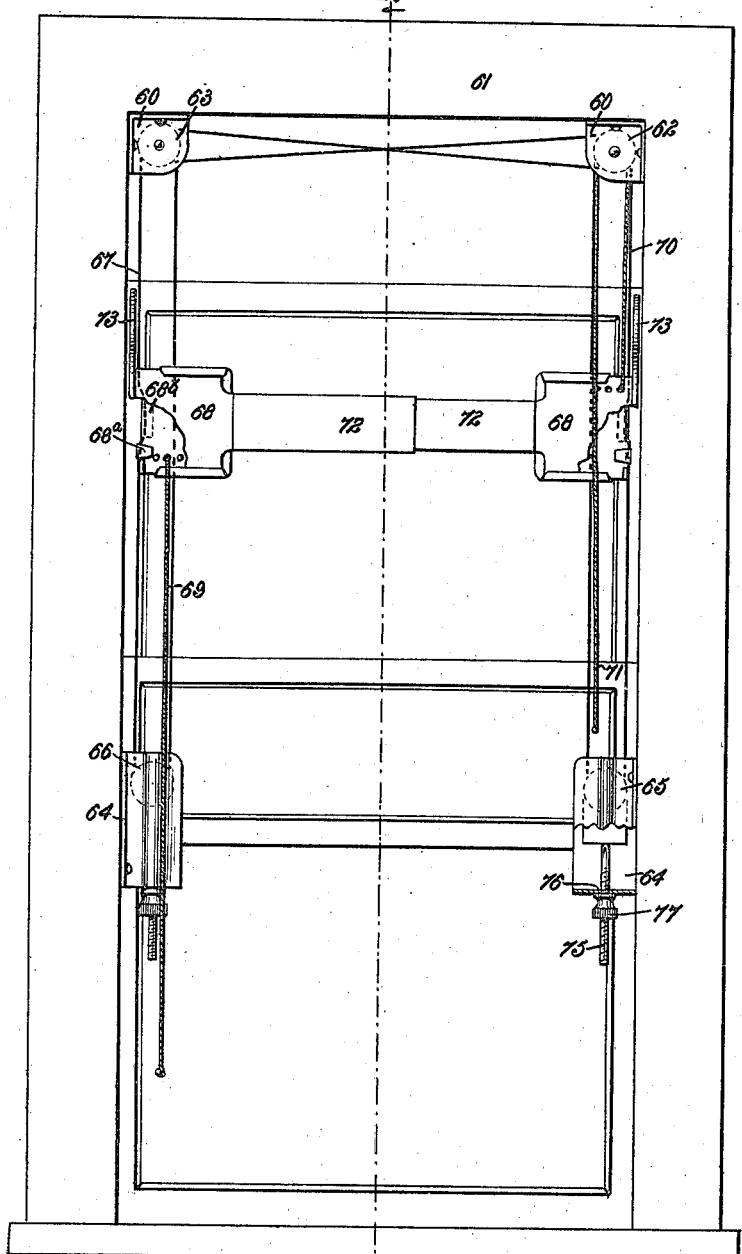
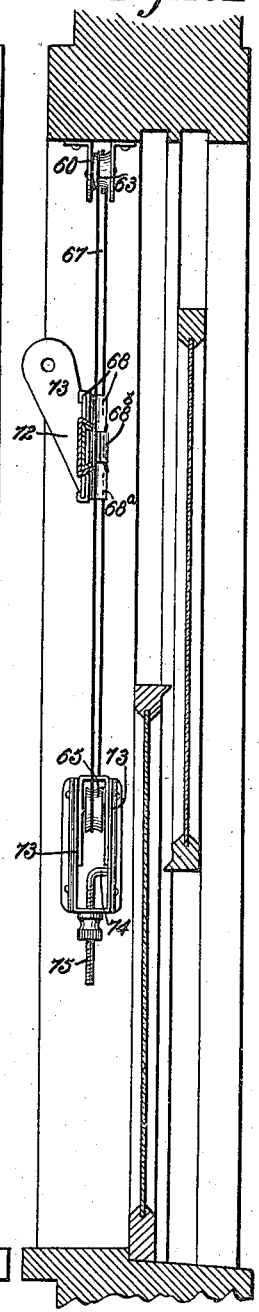
WITNESSES
Frank C. Palmer.
E. B. Marshall.
INVENTOR
Alva B. Smith
BY Munn & Co
ATTORNEYS

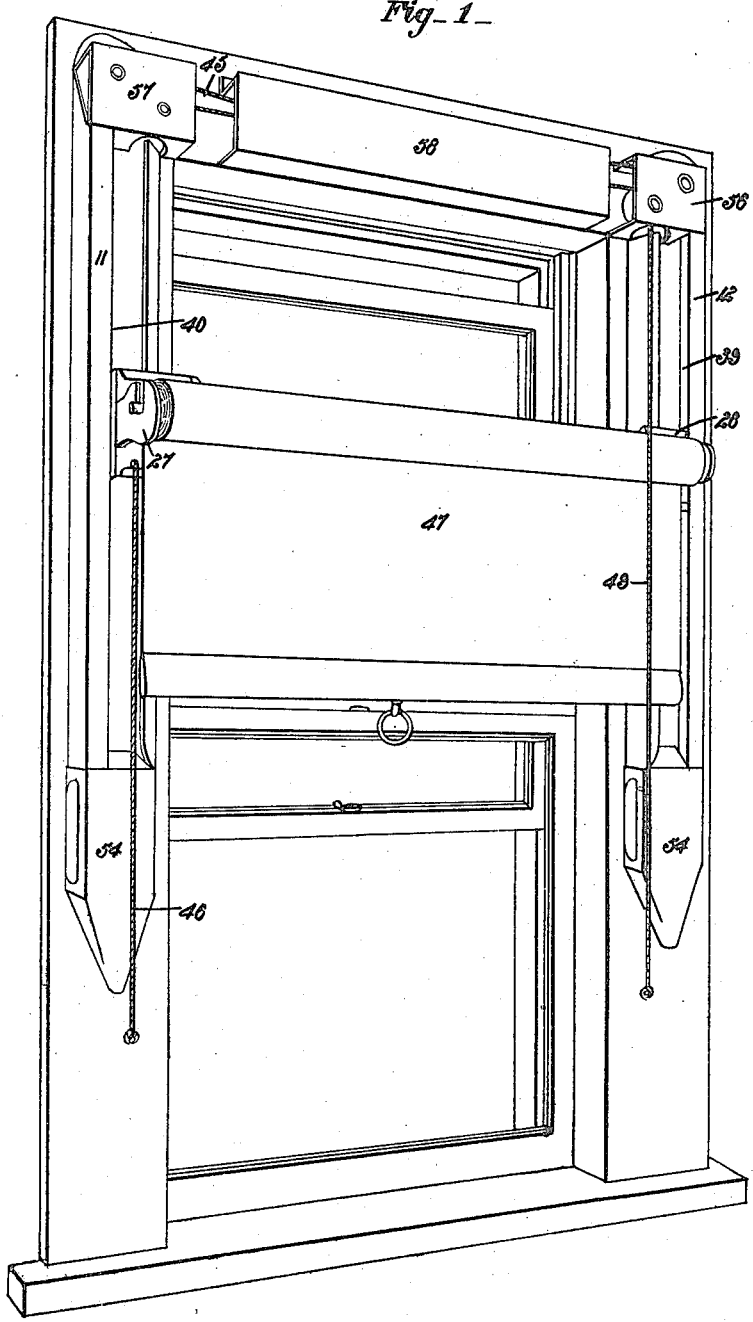

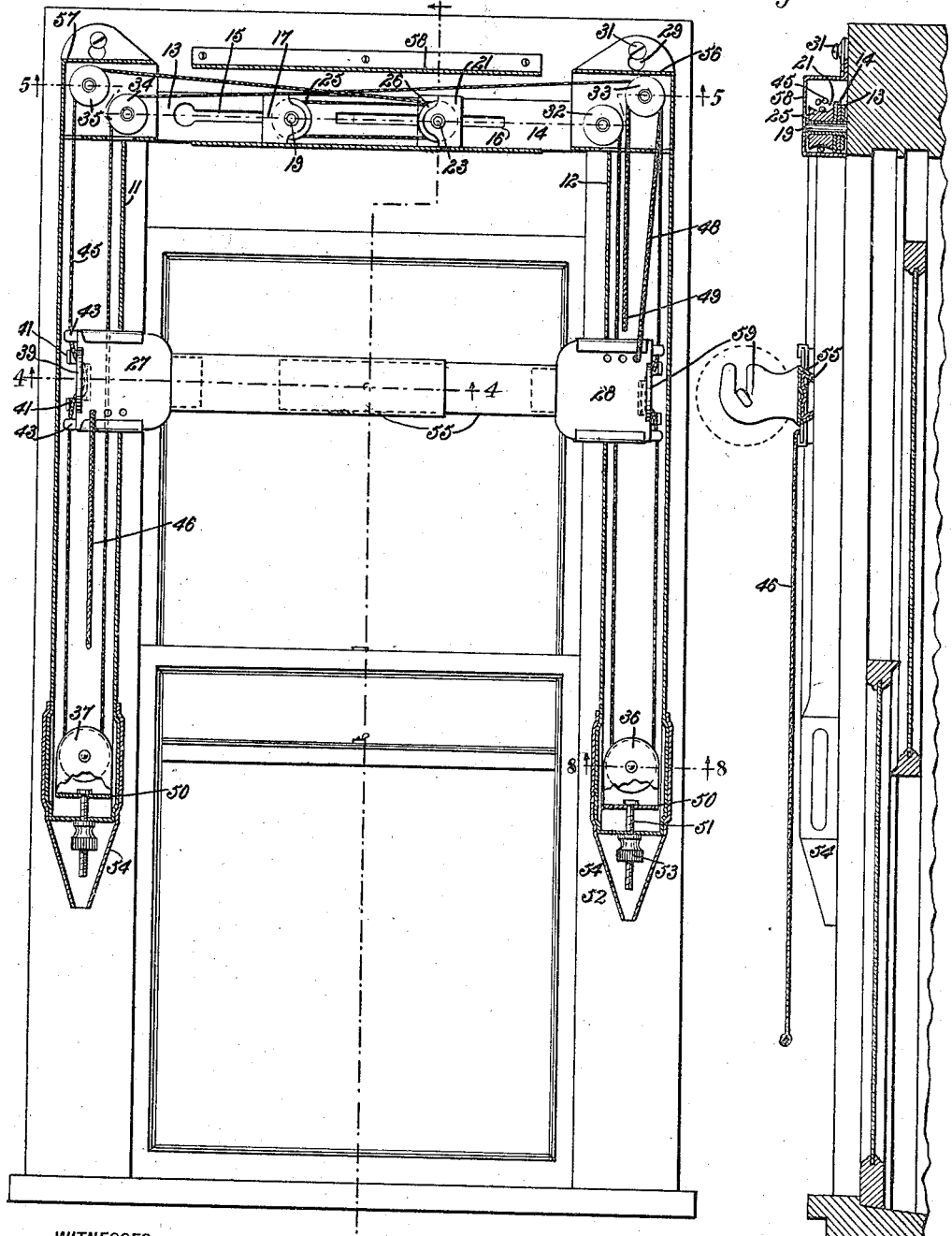

UNITED STATES PATENT OFFICE.

ALVA BERNARD SMITH, OF MEMPHIS, TENNESSEE, ASSIGNOR OF ONE-HALF TO ISAAC H. GUSDOFER, OF MEMPHIS, TENNESSEE.

SHADE-SUPPORT.

1,249,222.	Specification of Letters Patent.	Patented Dec. 4, 1917.

Application filed July 1, 1916. Serial No. 107,004.

*To all whom it may concern:*

Be it known that I, ALVA B. SMITH, a citizen of the United States, and a resident of Memphis, in the county of Shelby and State of Tennessee, have invented a new and Improved Shade-Support, of which the following is a full, clear, and exact description.

My invention has for its object to provide a shade support having brackets which are connected by telescoping members, the vertical portions of the brackets being regulated by a cord secured to the brackets and disposed around pulleys mounted on frame members detachably secured to a window frame, the frame members having guides which engage each other, pulleys being carried by the frame members at the guides around which the cord is disposed, so that the slack of the cord will be taken up when the frame members are moved in the direction of each other, and the cord will be freed to permit the frame members to move away from each other when occasion requires.

Another object of the invention is to provide a shade support which may be conveniently secured to a window frame.

Additional objects of the invention will appear in the following specification, in which the preferred form of the invention is disclosed.

In the drawings similar reference characters denote similar parts in all the views, in which—

Figure 1 is a perspective view showing a window frame to which my shade support is secured;

Fig. 2 is a front elevation showing a window frame provided with my shade support, parts being broken away to illustrate the construction;

Fig. 3 is a vertical sectional view of Fig. 2;

Fig. 4 is an enlarged sectional view on the line 4—4 of Fig. 2;

Fig. 5 is a sectional plan view illustrating the frames with laterally extending portions;

Fig. 6 is a transverse sectional view showing the top of one of the frame members;

Fig. 7 is a front elevation showing the bottom of one of the frame members;

Fig. 8 is an enlarged sectional view on the line 8—8 of Fig. 2;

Fig. 9 is a front elevation of a window shade provided with a modified form of shade support; and Fig. 10 is a vertical sectional view of Fig. 9.

By referring to the drawings, it will be seen that two frame members 11 and 12 are provided, the frame member 11 having a laterally extending portion 13 and the frame member 12 having a laterally extending portion 14, the laterally extending portion 13 being provided with a slot 15, and the laterally extending portion 14 being provided with a slot 16. The end of the laterally extending portion 14 is bent to form a bracket 17 having bearings 18 in which a stud 19 is disposed. This stud 19 has an end 20 which projects through the slot 15, the end 20 of the stud 19 being enlarged beyond the lateral extension 13, so that the slot 15 and the end 20 serve as a guideway and guide. Disposed against the lateral extension 14 there is a bracket 21 with bearings 22 in which a stud 23 is journaled, the stud 23 projecting through the slot 16 and beyond the lateral extension 14, so that it may be secured in an opening 24 in the lateral extension 13. With this construction, it will be seen that the lateral extensions 13 and 14 will be guided as the frame members 11 and 12 move to or from each other, and that a pulley 25 mounted on the stud 19, and a pulley 26 mounted on the stud 23 will be moved in the direction of each other when the frame members 11 and 12 are moved away from each other; and the pulleys 25 and 26 will be moved away from each other when the frame members 11 and 12 are moved in the direction of each other. This arrangement is provided to take up the slack in the cord which is used to raise and lower the brackets 27 and 28, and which I will describe.

The top and bottom of each of the frame members 11 and 12 are provided with key slots 29, so that the said frame members may be conveniently attached to or detached from a window frame 30 having screws or pins 31. At the top of the frame member 12 there are mounted two pulleys 32 and 33, the axis of the pulley 32 being disposed below and at the inner side of the axis of the pulley 33. In a similar manner, at the top of the frame member 11 there are mounted two pulleys 34 and 35, the axis of the pulley 34 being disposed below and at the inner side of the axis of the pulley 35. A pulley 36 is mounted at the lower end of the frame member 12, and a pulley 37 is mounted at the lower end of the frame member 11. The frame member 12 has a side 39 bent inwardly, as best shown in Fig. 4 of the drawings, to form a guideway, and the frame member 11 has a side 40 bent inwardly in a similar manner to form a similar guideway. These guideways 39 and 40 are provided for receiving outwardly extending terminals 41 on flanges 42 which extend inwardly from the brackets 27 and 28. The said flanges 42 are also provided with laterally extending terminals 43, and terminals 44 which are bent toward the center of the window frame, and then outwardly. This construction is made use of so that a cord 45 may be disposed at the rear of the terminals 43, in front of the terminals 41, and behind the flange 42, and in front of the terminals 44. This serves to secure the brackets 27 and 28 to the cord 45. The cord from the bracket 27 extends up and over the pulley 35 to the right; thence over the pulley 26, down at the right side of the pulley 26, under the pulley 26 to the left, and under the pulley 25 to the left; over the pulley 25 to the right; over the pulley 32 to the right; down, and under the pulley 36 to the right; up to the terminals 41, 43 and 44 on the bracket 28; up and over the pulley 33 to the left; over the pulley 34 to the left; down and under the pulley 37 to the left, and back to the bracket 27. With this construction, it will be seen that one of the brackets 27 and 28 may be pulled down, with the assurance that the other bracket will move downwardly therewith at the same rate of speed, and for the same length of time.

A cord 46 is secured to the bracket 27 for moving this bracket downwardly for the adjustment of a shade 47. A cord 48 is secured to the bracket 28 and is disposed over the pulley 33, so that when a terminal 49 of this cord is pulled down, it will serve to raise the bracket 28, which, by the means which have been described, will also carry upward the bracket 27. The pulleys 36 and 37 are mounted in brackets 50, from which depend screws 51, the screws passing through orifices 52 in the bottom of the frame members 11 and 12, a thumb nut 53 meshing with the screws 51 for drawing the brackets 50 down, as may be desired, to tigthen the cord 45. The lower portions of the frame members 11 and 12 are inclosed by casings or caps 54, this means being provided for covering the pulleys 36 and screws 51 and the thumb nuts 53. The brackets 27 and 28 have lateral telescoping portions 55. The pulleys 32 and 33 are inclosed by a casing 56; the pulleys 34 and 35 are inclosed by a casing 57, and the pulleys 25 and 26 are inclosed by a casing 58, these casings being best shown in Fig. 1 of the drawings. The brackets 27 and 28 are provided with the usual means 59 for supporting a shade roller.

In the construction illustrated in Figs. 9 and 10 of the drawings, brackets 60 are secured within and adjacent the top of a window frame 61, as illustrated, a pulley 62 being mounted in one of the brackets 60, and a pulley 63 being mounted in the other bracket, brackets 64 being secured below the brackets 60, as illustrated. A pulley 65 is mounted in one of the brackets 64, and a pulley 66 is mounted in the other bracket 64. With this construction a cord 67 extends up over the bracket 68, to which it is secured; over the pulley 63 to the right; under the pulley 62 to the right; over the said pulley 62 to the left; down and under the pulley 65 to the right; over the pulley 62 to the left; under the pulley 63 to the left; over the pulley 63 to the right; down and under the pulley 66 to the left, and thence up to the pulley 63 at the left. It will be understood that with this construction, one of the brackets 68 may be pulled down by the cord 69, thereby moving the other bracket 68 down therewith, and that one of the brackets 68 may be raised by means of a cord 70, which is disposed over the pulley 62, and which has a depending terminal 71. When the bracket 68 to which the cord 70 is secured, is raised, it will raise the companion bracket 68. The brackets 68 have laterally extending telescoping portions 72, and the brackets are provided with the usual means 73 for supporting a shade roller. The brackets 64 are provided with guideways 73, a pin 74 extending in one of the guideways 73 and then across, with its head in the other guideway 73, and with the pulley 65 mounted on the pin 74 between the guideways. A depending end 75 on the pin 74 is threaded, and is disposed through an orifice 76 in the bottom of the bracket 64, so that a thumb nut 77 which meshes with the threaded depending nut 75 on the pin 74, may be used to tighten the cord 67. Each of the brackets 64 is constructed in the same manner, the pulley 66 being mounted on the transverse portion of one of the pins 74, and the pulley 65 being mounted on the transverse portion of the other pin 74. The brackets 68 have outwardly extending terminals 68a, and terminals 68b at their inner sides, disposed in the direction of each other, so that the cord 67 may be held by these terminals 68a and 68b.

Having thus described my invention, what I claim as new and desire to secure by Letters Patent, is:

1. In a shade support, two frame members each having a lateral portion with a guide slot, two studs one secured to each lateral portion and each disposed in the slot in the companion lateral portion, pulleys mounted on the studs, additional pulleys mounted on the frame members, brackets, and flexible means connected with the brackets and disposed around the pulleys for the purpose specified.

2. In a shade support, two frame members each with a lateral portion provided with a slot, the lateral portions being disposed one in the rear of the other with a stud on the rear lateral portion extending forwardly in the slot in the front lateral portion, a stud on the front lateral portion having a rearwardly projecting end disposed in the slot in the rear lateral portion, pulleys mounted on the studs, additional pulleys on the frame members, and a cord disposed around the pulleys.

3. In a shade support, a frame having a guideway with an opening, a bracket provided with a flange disposed in the guideway, and from which extend two lateral terminals, two outer outwardly extending terminals and an inner outwardly extending terminal so that a cord in the guideway may be disposed under a lateral terminal, over an outer outwardly extending terminal, under the flange, over the inner outwardly extending terminal, under the flange, over an outer outwardly extending terminal, and under the other lateral terminal.

ALVA BERNARD SMITH.

Copies of this patent may be obtained for five cents each, by addressing the "Commissioner of Patents, Washington, D. C."